Nov. 5, 1963
M. A. VITEK
3,109,302
METHOD AND MEANS FOR PRODUCING CARPETS
AND PRODUCTS DERIVED THEREFROM
Filed April 29, 1959
5 Sheets-Sheet 3
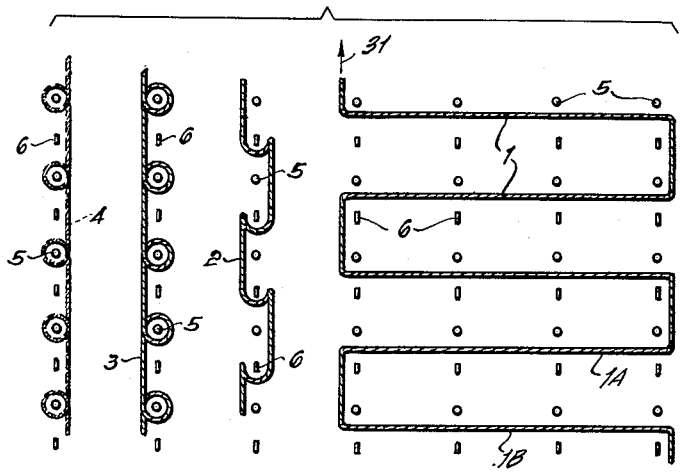
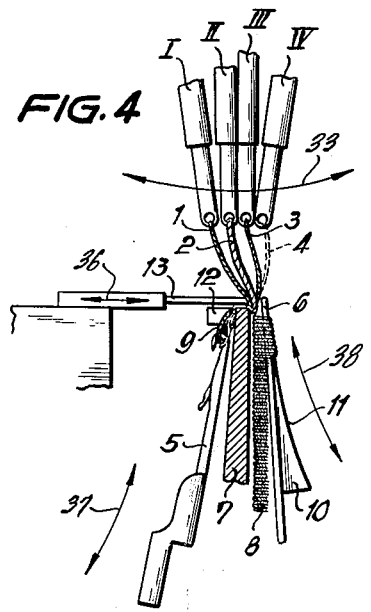
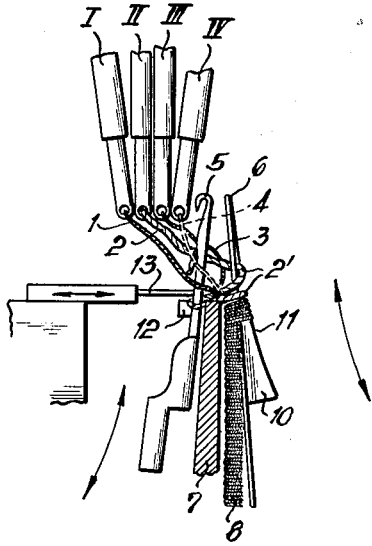
INVENTOR
MARCEL VITEK Nov. 5, 1963                M. A. VITEK                3,109,302
           METHOD AND MEANS FOR PRODUCING CARPETS
                  AND PRODUCTS DERIVED THEREFROM
Filed April 29, 1959                              5 Sheets-Sheet 4
FIG. 6    FIG. 7    FIG. 8    FIG. 9
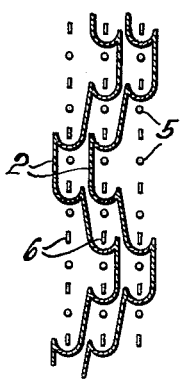 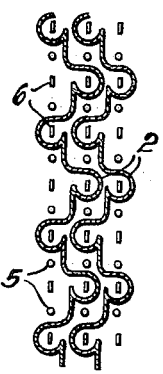 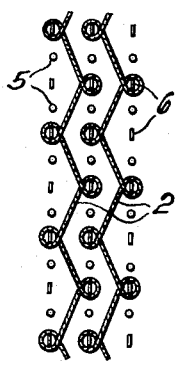 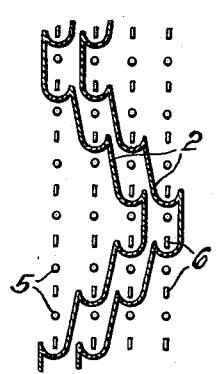
FIG. 10   FIG. 11   FIG. 12   FIG. 13   FIG. 14
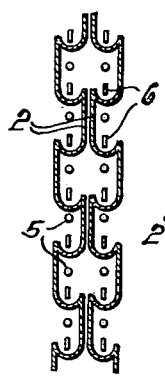 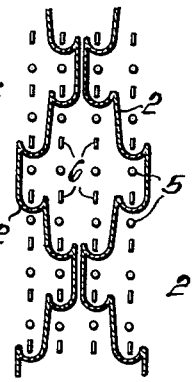 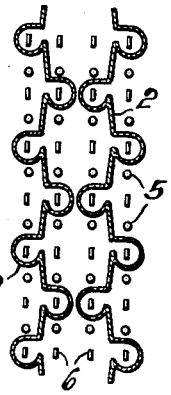 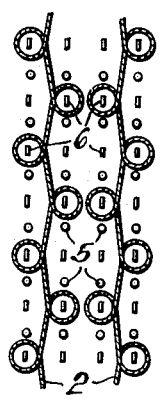 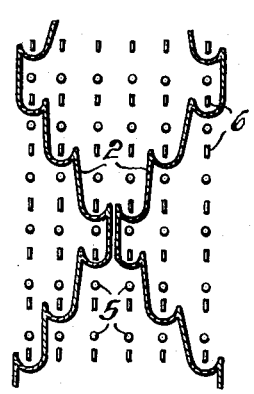
INVENTOR
MARCEL VITEK
BY

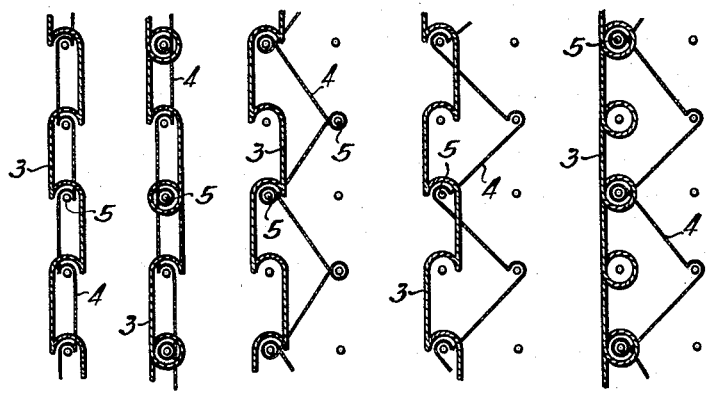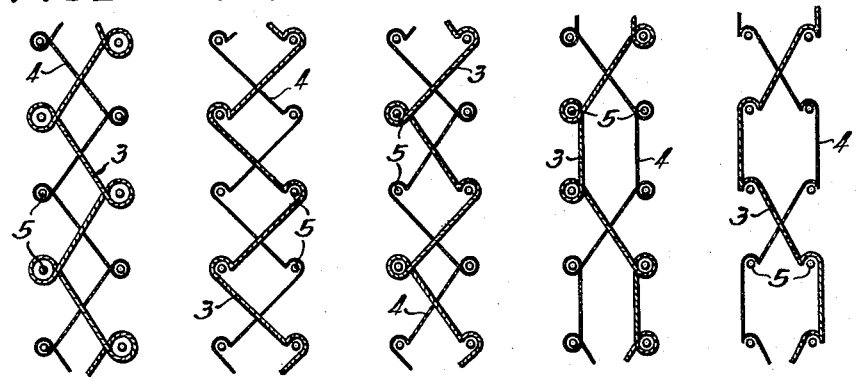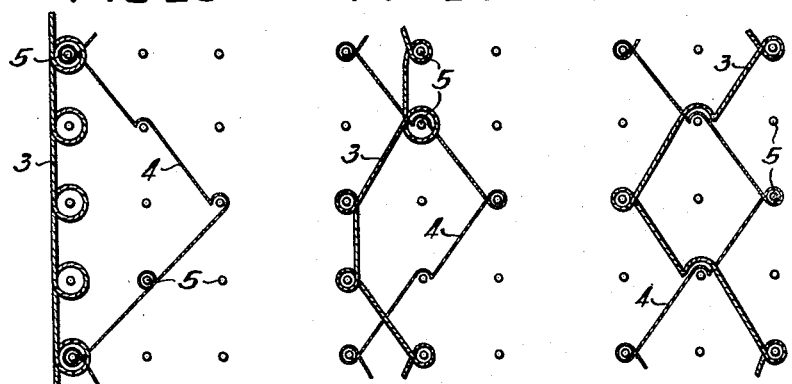

3,109,302
METHOD AND MEANS FOR PRODUCING CARPETS AND PRODUCTS DERIVED THEREFROM
Marcel A. Vitek, Hameln (Weser), Germany, assignor to Firma Besmer Teppichfabrik G.m.b.H., Hameln (Weser), Germany
Filed Apr. 29, 1959, Ser. No. 809,665
Claims priority, application Germany Dec. 5, 1958
2 Claims. (Cl. 66—193)

The present invention relates, in general, to carpets and to method of producing the same and, in particular, to velvet type produced in warp knitting machines.

Carpets of the type to which the present invention relates are knitted from three threads, namely, a filling thread, a pile thread and a binding thread.

One guide bar of the warp knitting machine is used for each thread so that a total of three guide bars is required to produce the carpet. If side by side knitted effects are desired in the nap, in the warp direction, additional guide bars will be required for the pile thread.

In the prior art thread binding stitches, the filling thread is never permitted to lay over the needles, that is, to form stitches therewith. In addition, needle stitches are never formed with the pile thread, only an underlaying operation being performed which must correspond to the particular method being utilized to form the nap. As a result, the binding thread alone forms needle stitches and this thread alone binds all the threads together into solid carpeting. As a result, the first guide bar is provided with the filling thread, the second guide bar is provided with the pile thread and the third guide bar is provided with the binding thread. The most common constructions into which the binding thread is formed are crochet stitches on a needle, or so-called open or closed fringes, as well as simple, open or closed tricot layings or stitches.

Prior art carpeting knitted on warp knitting machines had the disadvantageous feature that a good surface presentation could be obtained only with loop pile, and then only with an excessively large pile thread consumption. Such excessive pile thread consumption resulted from the fact that the prior art pile tying methods forced the pile into a slanting position which varied according to the thread laying directions of the pile and binding guide bars. To prevent alternate tying, it was necessary to make additional pile thread layings and this required the utilization of much pile thread. However, there was obtained a strong and durable tying of the pile threads. When a minimum of pile thread is utilized, there results an inferior tying of the pile thread with an increased varying slant of the pile legs as a result of which both the durability and appearance of the carpeting are greatly impaired.

Although the problem involving cutting tools has been solved by the prior art, and although there is a desire to produce cut pile on the warp knitting machine, no such cut pile is now available. The irregular appearance of the final product has always defeated the result. Velvet carpeting in particular must meet the highest requirements.

These requirements are the following:

(1) Well tied pile that cannot become undone even under peak stress.
(2) The pile tufts should be as close to the vertical as is possible.
(3) The pile legs, which form the pile tufts, should be cut in equal lengths or heights.
(4) In order to minimize costs, the maximum possible percentage of the worked pile thread should serve to form pile tufts and a minimum percentage should be used to anchor the tufs.

The prior art method for forming the nap is as follows:

One needle-bed of a twin-needle bed warp knitting machine is equipped with loop pins instead of with the usual needles. The cast-off plate associated with the second needle-bar is omitted. In this case, the laying of pile thread both over and under the loop pins can be effected, so that pile loops remain after completed beat-off of the stitch row.

If, at the instant of cast-off, the loop pins are lowered sufficiently, the pile loops come off the pins to become free and remain as pile loops. However, if the loop pins are insufficiently lowered, the pile loops remain on the pins and subsequently can be cut on the pins by conventional cutting tools to form velvet. As cutting takes place at the center of the loop pins, the cut heights of the pile legs become unequal in the prior art thread layings, since tying of the pile loops laid on the pins occurs to the left of the pin in one row and to the right of the pin in the next row. Moreover, due to alternating tying of the loops from one row to the next, the pile legs tend to incline in opposite directions and greatly impair the appearance of the carpeting.

As a result of the method of manufacturing loop pile carpeting which has been in use for a decade, there has arisen the misconception that one can or must work with only one binder thread or only one binder thread guide bar, particularly because the laying of the binder thread guide bar over the needle should always occur in the direction of the laying of the pile thread since it is believed that laying in opposite directions would result in the difficulty that the binder would pull the pile thread into the needle.

It is an object of the present invention to overcome the prior art misconception that laying of the binder thread cannot be effected counter to the laying of the pile thread.

It is another object of the present invention to provide means for insuring the feasibility of any desired laying of pile and binder threads.

It is another object of the present invention to provide means for attaining the prevention of unequal pile leg length and for avoiding unequal cutting thereof.

It is a further object of the present invention to provide means which result in compensation for different inclinations of the pile legs from row to row of the pile.

It is a still further object of the present invention to provide means achieving a substantial increase in the anchoring of the pile on the woven material.

These and other objects of the invention will become further apparent from the following detailed description, reference being made to the accompanying drawings showing preferred embodiments of the invention.

In the drawings which illustrate the best modes presently contemplated for carrying out the present invention:

FIG. 3 is a schematic of the thread laying fashion of the stitch patterns shown in FIGS. 1 and 2;

FIGS. 4 and 5 are schematic representations in different relative positions of the loop-forming portions of the knitting machine (parts being broken away);

FIGS. 6 through 9 are similar to FIG. 3 and illustrate additional examples of pile thread layings with a fully threaded pile guide bar;

FIGS. 10 through 14 are similar to FIG. 3 and show examples using two fully drawn-in and oppositely laying pile thread guide bars; and FIGS. 15 through 27 are similar to FIG. 3 and show examples of binder thread layings using two guide bars.

The problem underlying the present invention was the provision of means for fulfilling the four previously listed requirements for velvet carpeting. Pursuant to the present invention, in addition to the minimum requirements of using two guide bars for the filler and pile threads, there are utilized preferably two fully threaded binder thread guide bars which operate in opposite directions and which bind the laid pile loops so that they are evenly tied on both sides of the loop pins. By the use of the additional or second binder thread guide bar, there is produced a velvet carpeting which meets, in the highest degree, all of the previously stated conditions.

Figure 1:
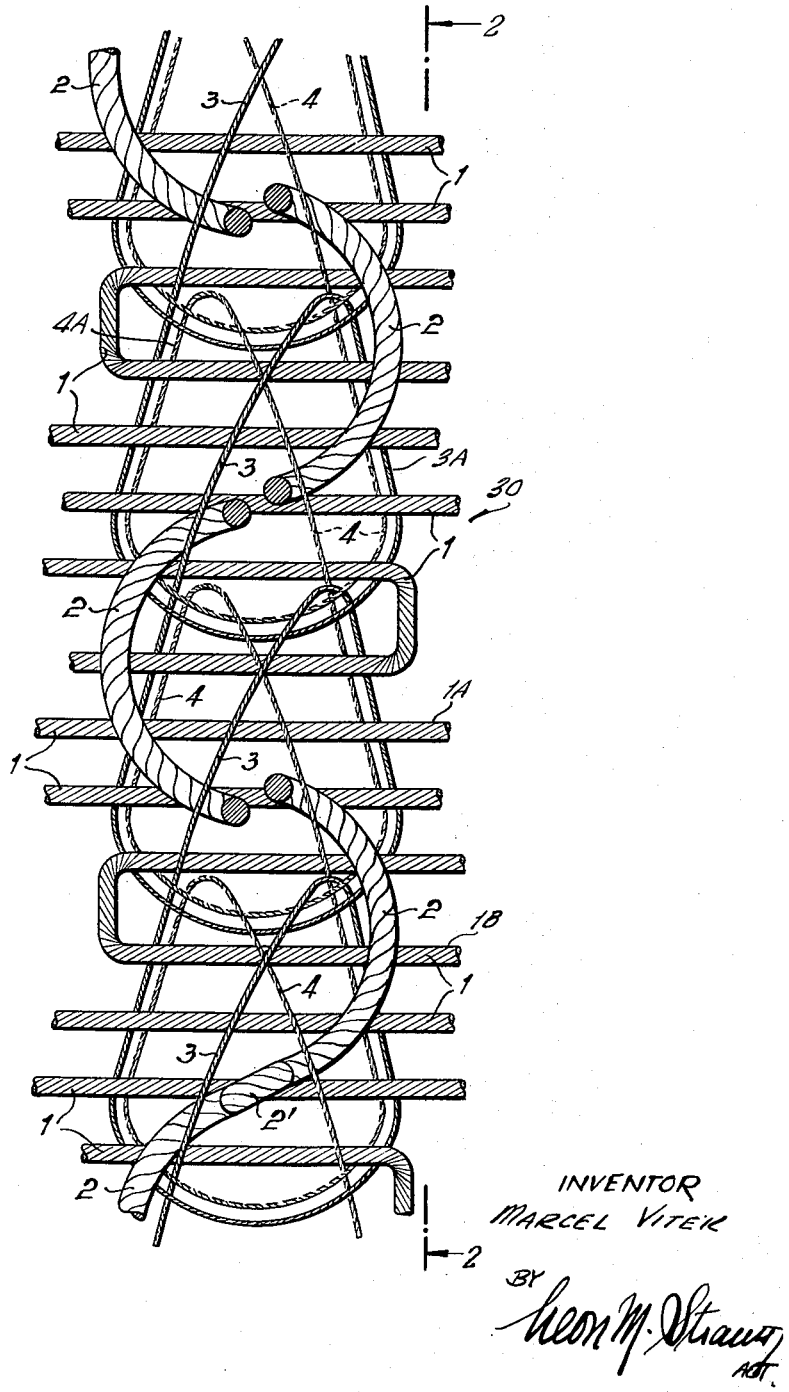
FIG. 1 is a fragmentary plan view, with portions removed, of the knitted fabric in a stitch row.

Referring now to FIGS. 1 through 5 in detail, there is shown in FIG. 1 a strip 30 of carpeting wherein a filler thread 1, which for example may be a jute thread, is laid under four needles 5, as best shown in FIG. 3, alternately in a right-hand laying 1A and in a left-hand laying 1B, proceeding in the direction of arrow 31. Two binder threads 3 and 4 which, for example, may be formed of synthetic yarn, form loopings 3A and 4A, respectively, or so-called one-needle closed fringe tufts. It will be noted from the thread laying pattern of FIG. 3 and from FIGS. 4 and 5, that the binder thread guide bars III and IV operate in opposite directions, as shown by arrows 33, so that the binder threads 3 and 4 extend in opposite directions.

Tracing the pile thread 2, it will be noted that the individual pile loops or burls 2' are each tied twice, the binder threads 3 and 4 crossing the filler thread layings 1A and 1B after each individual tying of a pile or burl leg 2A, so that each crossing anchors a leg to the base 34 of the fabric. For purposes of illustration only, the pile legs in FIG. 1 have been cut off near the fabric base. However, FIG. 2 clearly illustrates the manner in which the two pile legs 2A of each loop 2' stand up under the bilaterally directed pressure of the binders 3 and 4 at the cross-overs 35, so as to support each other and the legs crop out of the stitch interior through the binder threads. Consequently, the pile legs protrude vertically from the center line of the looping pins or crochets 3A and 4A to form burl tufts and they are enclosed by portions of the binder threads 3 and 4.

Figure 2:
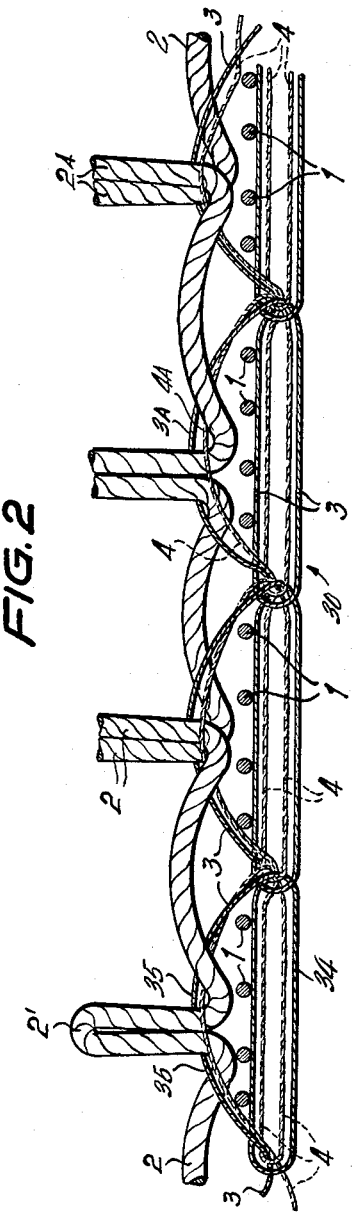
FIG. 2 is a sectional view on the line 2—2 of FIG. 1, the stitch pattern of the binder threads being schematically shown.

The fabric illustrated in FIGS. 1 through 3 is particularly advantageous in that it represents the most economical pile thread laying that can be made while providing for maximum anchoring or securement of the pile or burl legs. Any possibility of the binder thread pulling the pile thread into the needle is eliminated due to the fact that in addition to oppositely directed binder layings there are also codirectional binder laying.

FIG. 3 schematically illustrates the laying arrangement of the fabric 30 shown in FIGS. 1 and 2. The dots extending in a row from the bottom to the top of the figure each represent a needle 5 of the knitting machine, while the stroke 6 below each dot represents the loop pin located in front of the needle. The lines extending around the dots or strokes indicate the movements executed by the guide bars I, II, III and IV from stitch row to stitch row, the thread layings of each guide bar being shown separately for purposes of illustration. More specifically, the first row on the left-hand side of FIG. 3 illustrates the laying of the binder thread 4, which is laid by the guide bar IV. The second row illustrates the laying of the binder thread 3, which is laid in a direction opposite to the laying of binder thread 4, by the guide bar III. The laying scheme of the pile thread 2 is shown in the third row, the pile thread being laid about the loop pin 6. Finally, at the right-hand side of the figure, there is shown the laying scheme for the filler thread, which is laid under four needles 5 in a reciprocatory movement. It will be understood that it is within the scope of the present invention to lay the filler thread under a greater or lesser number of needles.

FIGS. 4 and 5 illustrate the stitch forming elements of the knitting machine with the number of guide bars corresponding to that for producing the fabric shown in FIGS. 1 through 3. The filler thread 1 is carried by the guide bar I. The pile thread 2 is carried by the guide bar II. The binder threads 3 and 4 are carried by the guide bars III and IV, respectively. Since the present invention relates to a commercial type warp knitting machine, FIGS. 4 and 5 are limited to an illustration of the most important stitch forming members. Needles 5, here shown as latch needles, are positioned one behind the other in a row below the guide bars. Since the needle drive is conventional, it is not illustrated. Conventional loop pins 6, having the same gauge as the needles, are arranged in a row opposite the needles. The loop pins are driven by a conventional drive, not illustrated. Conical knives 10, having outwardly extending cutting edges 11, which are insertable into the loop pins, are mounted in conventional manner. The pile loops 2', which are slid down, are cut open by the knives 10.

A fixed cast-off plate 7 is mounted between needles 5 and loop pins 6 and functions to retain the finished product 8 at the instant that the stitch 9 is cast off so as to enable the needles 5 to rise freely through the stitch 9. At the upper end of the needle, at the side thereof, a lug 12 is attached in conventional manner. The lug is of comb-like design and corresponds to the needle gauge.

A row of horizontally disposed sinkers 13, having the same gauge as needles 5 and loop pins 6, are disposed at the level of the upper end of cast-off plate 7, and are directed at gaps thereof. The sinker drive is conventional and not illustrated. The sinkers are moved forward over the fabric 8, above the cast-off plate 7, before the needles rise to prevent the fabric from moving up with the needles. Before the newly laid stitch row is cast off, the sinkers are retracted so as not to hinder the casting off of the stitches. FIG. 4 illustrates the various stitch-forming members immediately before the needles are raised and FIG. 5 shows said members after the two binder thread guide bars III and IV have been placed over the needles. The sinkers reciprocate, as indicated by arrows 36. Arrows 37 and 38, respectively, indicate the reciprocatory movements of the needles 5 and the pins 6.

FIGS. 6 through 14 schematically show different arrangements for the laying of pile thread. FIGS. 6 through 9 show arrangements using one fully threaded pile guide bar.

In FIG. 6 two loop layings are carried out alternately to the right and to the left. These layings are executed as open layings, in the same manner as in FIGS. 1 through 3, but they require a slightly higher consumption of pile thread due to the change from one needle to the other.

FIG. 7 illustrates an embodiment wherein the pile laying is effected by a change of needles and at the same time a change of laying direction is effected from row to row.

FIG. 8 illustrates a pile thread laying arrangement which is similar to conventional closed tricot laying.

FIG. 9 illustrates a modification of the arrangement shown in FIG. 6 with a three needle change being utilized.

FIGS. 10 through 14 illustrate pile thread laying arrangements which correspond to the arrangements shown in FIGS. 3 and 6 through 9, but wherein there is utilized two fully threaded pile guide bars which shift in opposite directions. In each of these figures, there is necessarily formed in each stitch of the binder threads a pile loop or burl tuft which comprises four legs, two of which may be of a different color.

FIGS. 15 through 27 illustrate different binder thread laying arrangements. The oppositely extending binder threads are represented in such a manner that they cover each other in the respective needle rows. The threads threaded in the various guide bars are illustrated differently in the figures, but this is not intended to indicate that one thread or yarn is of a different material from the other.

Threads of the same material and of the same thickness may be used. In addition, it is immaterial which one of the thread guide bars III or IV executes the layings according to the thicker or the thinner thread representations.

FIG. 15 illustrates an open fringe thread laying over one needle.

FIG. 16 illustrates a closed and an open fringe, in succession, over one needle.

FIG. 17 illustrates an open fringe laying over one needle in one guide bar, in conjunction with a simple closed tricot in the second guide bar. FIG. 18 differs from FIG. 17 only in that the second guide bar lays open tricot.

FIG. 19 illustrates a closed fringe laying over one needle in conjunction with a combined open and closed tricot laying in the second guide bar.

FIGS. 20 and 21 illustrate in both guide bars an oppositely directed tricot laying or double tricot. FIG. 20 illustrates a closed tricot laying while FIG. 21 illustrates an open tricot laying.

FIG. 22 illustrates an arrangement where both guide bars operate alternately and oppositely to provide an open and a closed tricot laying.

FIGS. 23 and 24 illustrate an arrangement wherein each fringe laying is followed by a tricot laying. In FIG. 23 closed stitches are formed and in FIG. 24 open stitches are formed.

FIG. 25 illustrates an arrangement wherein one guide bar lays closed fringes over one needle while the other guide bar executes an atlas laying, wherein two closed stitches follow two open stitches.

FIG. 26 represents an arrangement wherein one guide bar lays a tricot laying following a fringe laying, while the other guide bar executes an atlas laying having, alternately, an open and a closed switch laying.

FIG. 27 represents an arrangement wherein both guide bars execute an atlas knit, wherein a closed stitch is followed by an open stitch.

It will be apparent from each of the illustrated embodiments, all of the knittings have the common characteristic that all "overlayings" are oppositely directed.

It will be understood that all of the illustrated binder thread layings can be combined with each of the illustrated pile thread layings so that there are a great number of possible combinations which, if desired, could be further supplemented, but all of which have the fundamental feature of the present invention. Since it does not matter how the filler thread lays, the various different laying arrangements therefor are not illustrated.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. Warp knitted carpeting, particularly of the velvet type, comprising three groups of thread, namely filler thread extending back and forth to form a fabric base, pile forming thread extending above said filler thread and forming a plurality of upstanding loop piles, and at least two warps of binder threads for tying said pile forming thread to said fabric base, said threads of double binder warps being crochet knitted and extending in plated relationship, so as to form a pair of oppositely directed stitches in each wale of the carpeting, each pair of binder stitches bindingly engaging the pile loops uniformly on both sides, but urging them in opposite directions, so that the pile loops are urged into an upstanding position from substantially the center of the double crochet stitches.

2. Carpeting as claimed in claim 1, wherein said loop piles are cut to form cut piles.

References Cited in the file of this patent

UNITED STATES PATENTS

| | | |
|---|---|---|
| 263,999 | Truitt | Sept. 5, 1882 |
| 2,015,818 | Schonfeld | Oct. 1, 1935 |
| 2,137,692 | Linke | Nov. 22, 1938 |
| 2,331,289 | Amidon | Oct. 12, 1943 |
| 2,435,897 | Newman | Feb. 10, 1948 |
| 2,476,153 | Little et al. | July 12, 1949 |
| 2,557,482 | Stolle et al. | June 19, 1951 |
| 2,891,396 | MacCaffray | June 23, 1959 |
| 2,892,331 | Kelly | June 30, 1959 |
| 2,899,813 | Herrnstadt et al. | Aug. 18, 1959 |